UNITED STATES PATENT OFFICE.

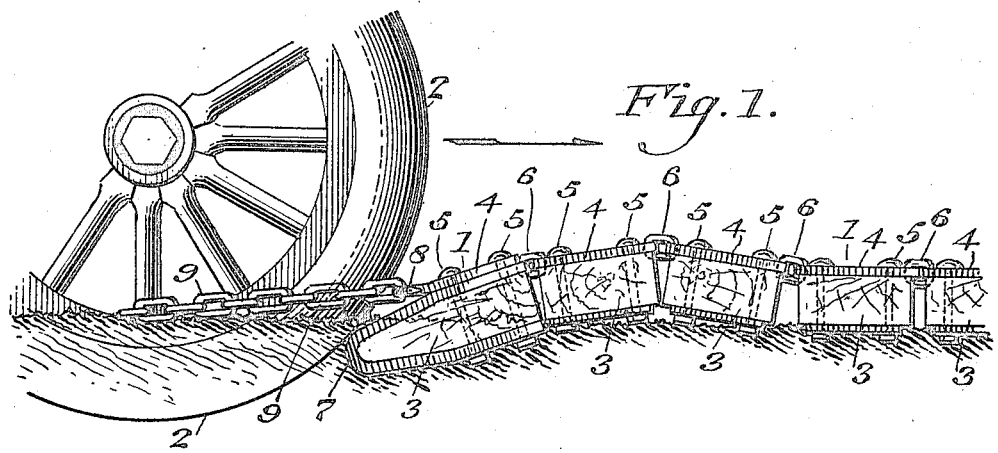
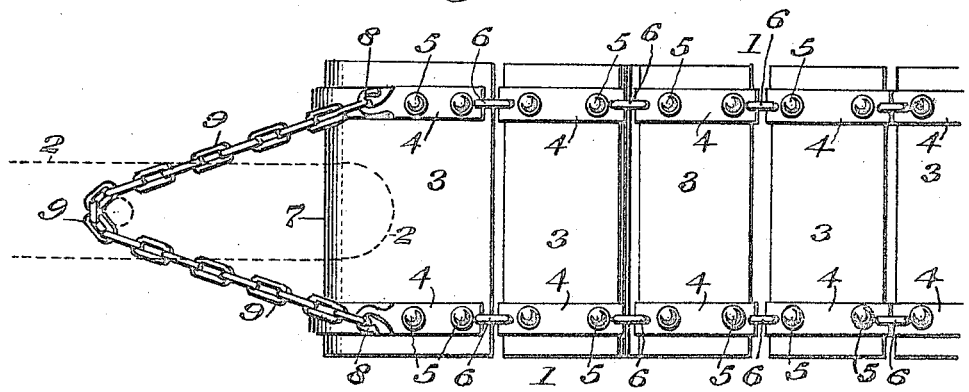

WILLIAM FRANCIS PATTERSON, OF PHILADELPHIA, PENNSYLVANIA.

TRACTION DEVICE FOR EXTRACTING STALLED VEHICLES.

1,403,190.  Specification of Letters Patent.  Patented Jan. 10, 1922.

Application filed January 22, 1920. Serial No. 353,170.

*To all whom it may concern:*

Be it known that I, WILLIAM F. PATTERSON, a citizen of the United States, residing in the city and county of Philadelphia, State of Pennsylvania, have invented a new and useful Traction Device for Extracting Stalled Vehicles, of which the following is a specification.

My invention relates to a device adapted for extracting motors or other vehicles, when stalled or mired in mud, sand, snow, holes, ruts, etc., whereby the same may be effectively accomplished, avoiding the spinning of the wheels, tearing of the tires and injury to the vehicles, the device being of strong, durable and inexpensive construction and adapted to be folded in compact form and readily carried along with the vehicle.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a traction device embodying my invention, including a portion of a vehicle wheel with which the same is connected.

Figure 2 represents a top or plan view thereof.

Similar numerals of reference indicate corresponding parts in the figures.

Referring to the drawings.

1 designates what I denominate a traction bed with which a wheel 2 of a stalled vehicle is adapted to engage so as to run over the same and so drag or draw the vehicle from mud, sand, snow, holes, gullies, ruts or whatever occasioned the vehicle to be stalled, a bed being employed for each rear wheel.

The bed is formed in sections consisting of a series of blocks 3 preferably of hard wood, and bars 4, preferably of metal which latter extend longitudinally on the upper face thereon and are firmly secured thereto by the bolts 5 which are passed through the bars and blocks and held in place by nuts suitably applied to the undersides of the blocks where said nuts take sufficient hold of the ground to prevent slipping of the device when in use and obviate pinning of the latter to the ground. Links 6 connect the bars of adjacent blocks, said bars and links acting as leaves and knuckles of hinges thus articulating the blocks and adapting the latter to be spread out and laid down on the ground as shown in Figure 1, or to be rolled up and form a compact bundle which may be carried in the vehicle so as to be convenient for service when so required.

The section that comprises the beginning of the device toward the wheel 2 forms an incline plane and presents a tapering nose 7 to the tire of said wheel. On the forward ends of the bars of said section are hooks 8 to which are attached the chain or flexible connection 9 which is bent or doubled on itself and passed around one of the spokes of the wheel 2, thus connecting the drag bed with said wheel and consequently with the vehicle.

The operation is as follows:—

The pads are seated on the ground adjacent to a place where the vehicle is stalled or mired in front of the same, and the noses 7 brought close to the tires of the rear wheels. Chains 9 are then passed around spokes of said wheels and their ends are attached to the hooks 8. The vehicle is then started forward whereby the tires of said wheels engage the noses 7 and take traction of the first sections of the beds and ride up the same and then over the adjacent sections of the beds, thus drawing the said rear wheels from the mud, etc. the front wheels being also impelled, thus directing again the vehicle to the good road or ground.

It will be seen that as the wheels advance, the chains 9 are drawn rearwardly by the same and so the noses 7 of the first sections of the beds are pressed tightly against the tires whereby the latter positively take traction on said sections and ride up the same. The longitudinally-extending bars 4 rise from the blocks on opposite sides thereof as shoulders forming elevated guards which serve to prevent the wheel 2 from running off sideways from the blocks should there be any irregularity of said wheel riding on the blocks. The looped chain has its side portions diverged from the bend of the chain, thus clearing the tire of the wheel of said chain so that it may run freely on the blocks without interference of said chain.

Furthermore as the connection for the chain 9 is on the nose bar and thus near the wheel end of the device said bar is drawn first to the wheel and engaged therewith, and it then draws the other bars positively after it, and avoids buckling of the device, while effectively placing the wheels on the bars one after the other without interference.

The blocks 3 being of wood adapt the wheels to take firm traction thereon and by their frictional nature prevent the tires from slipping thereon, while the bars 4 reinforce and so strengthen the blocks and provide the means for holding the links 6 in position, whereby the sections of the bed are connected and jointed or articulated.

When the work is accomplished, the chain 9 is unhooked and removed from the spoke of the wheel, when the pads may be folded and placed with the chain in the vehicle to be carried along for further use.

Having thus described my invention what I claim as new and desire to secure by Letters Patent, is:—

In a device for extracting stalled-vehicles, a series of blocks, reinforcing and guide bars on opposite sides of the upper faces of said blocks, means for securing said bars to said blocks, knuckle-members connecting adjacent bars, a hook-like member on the nose bar of the device near the wheel end, and a chain-like member adapted to be connected with said hook-like member and attached to the wheel.

WILLIAM FRANCIS PATTERSON.

Witnesses:
JOHN A. WIEDERSHEIM,
N. BUSSINGER.